United States Patent
Meyers

(10) Patent No.: US 11,184,246 B1
(45) Date of Patent: *Nov. 23, 2021

(54) DEVICE DIFFERENTIATION FOR ELECTRONIC WORKSPACES

(71) Applicant: Amazon Technologies, Inc., Seattle, WA (US)

(72) Inventor: James David Meyers, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/872,104

(22) Filed: May 11, 2020

Related U.S. Application Data

(63) Continuation of application No. 16/382,852, filed on Apr. 12, 2019, now Pat. No. 10,659,308, which is a continuation of application No. 15/923,138, filed on Mar. 16, 2018, now Pat. No. 10,263,851, which is a continuation of application No. 14/605,746, filed on Jan. 26, 2015, now Pat. No. 9,923,776, which is a continuation of application No. 13/052,467, filed on Mar. 21, 2011, now Pat. No. 8,941,556.

(51) Int. Cl.
*H04L 12/24* (2006.01)
*G06F 3/14* (2006.01)
*G09G 5/00* (2006.01)

(52) U.S. Cl.
CPC ............ *H04L 41/12* (2013.01); *G09G 5/00* (2013.01); *G06F 3/1423* (2013.01); *G09G 2340/14* (2013.01)

(58) Field of Classification Search
CPC .......... H04L 29/06027; H04L 65/1036; H04L 65/1026; H04L 41/12; H04W 84/10; H04W 4/00; H04W 76/02; G09G 5/00; G09G 3/1323; G09G 2340/14
See application file for complete search history.

(56) References Cited

U.S. PATENT DOCUMENTS

| | | | |
|---|---|---|---|
| 8,253,693 B2 * | 8/2012 | Buil | H04B 13/005 345/173 |
| 8,458,255 B2 | 6/2013 | Takeuchi | |
| 10,659,308 B1 * | 5/2020 | Meyers | G09G 5/00 |
| 2002/0054154 A1 | 5/2002 | Fukuda et al. | |
| 2003/0137470 A1 | 7/2003 | Brown et al. | |
| 2004/0070608 A1 | 4/2004 | Saka | |

(Continued)

OTHER PUBLICATIONS

Non Final Office Action dated Sep. 10, 2019 for U.S. Appl. No. 16/382,852 "Device Differentiation for Electronic Workspaces" Meyers, 11 pages.

(Continued)

*Primary Examiner* — Stephen G Sherman
(74) *Attorney, Agent, or Firm* — Lee & Hayes, P.C.

(57) ABSTRACT

An electronic workspace may be created from multiple viewer devices. The viewer devices are coordinated so that each exhibits a different visual identification characteristic such as a distinct or unique color. Content can be assigned by way of a user interface in which individual viewer devices are represented by visual icons that exhibit the same visual identification characteristics as the respective viewer devices, so that a user may easily distinguish between the available viewer devices.

20 Claims, 6 Drawing Sheets

(56) References Cited

U.S. PATENT DOCUMENTS

| | | |
|---|---|---|
| 2007/0027960 A1 | 2/2007 | De Leon |
| 2007/0152957 A1 | 7/2007 | Shibata |
| 2008/0235593 A1 | 9/2008 | Nagata et al. |
| 2011/0113097 A1* | 5/2011 | Takeuchi .......... H04N 1/00283 709/204 |
| 2011/0140840 A1 | 6/2011 | Hardacker et al. |
| 2012/0001831 A1 | 1/2012 | Smith et al. |

OTHER PUBLICATIONS

Office action for U.S. Appl. No. 14/605,746, dated Dec. 22, 2016, Meyers, "Device Differentiation for Electronic Workspaces", 21 pages.
Office action for U.S. Appl. No. 13/052,467, dated May 10, 2013, Meyers, "Device Differentiation for Electronic Workspaces", 16 pages.
Office Action for U.S. Appl. No. 13/052,467, dated May 29, 2014, James David Meyers, "Device Differentiation for Electronic Workspaces", 11 pages.
Office action for U.S. Appl. No. 14/605,746, dated May 9, 2017, Meyers, "Device Differentiation for Electronic Workspaces ", 15 pages.
Office Action for U.S. Appl. No. 15/923,138, dated Jun. 18, 2018, Meyers, "Device Differentiation for Electronic Workspaces", 15 pages.
Office action for U.S. Appl. No. 13/052,467, dated Sep. 6, 2013, Meyers, "Device Differentiation for Electronic Workspaces", 19 pages.

* cited by examiner

DEVICE DIFFERENTIATION FOR ELECTRONIC WORKSPACES

CROSS-REFERENCE TO RELATED APPLICATIONS

This application is a continuation of and claims priority under 35 U.S.C. 120 to U.S. patent application Ser. No. 16/382,852, filed on Apr. 12, 2019, entitled "Device Differentiation for Electronic Workspaces," which is a continuation of U.S. patent application Ser. No. 15/923,138, filed on Mar. 16, 2018, entitled "Device Differentiation for Electronic Workspaces," now U.S. Pat. No. 10,263,851, which is a continuation of U.S. patent application Ser. No. 14/605,746, filed on Jan. 26, 2015, entitled "Device Differentiation for Electronic Workspaces," now U.S. Pat. No. 9,923,776, which issued on Mar. 20, 2018, which is a continuation of and claims priority to U.S. patent application Ser. No. 13/052,467, filed on Mar. 21, 2011, entitled "Device Differentiation for Electronic Workspaces", now U.S. Pat. No. 8,941,556, which issued on Jan. 27, 2015, the entirety of each of which is incorporated by reference herein.

BACKGROUND

It has been forecast for many years that computers will eventually eliminate the need for paper in office and business environments. Although this has yet to take place, the increasing availability of inexpensive reader devices may help to fulfill this forecast.

The availability and use of such reader devices has increased in part due to advances in display technologies, and in particular due to advances in so-called "electronic paper" or "e-paper" technologies. These technologies have been increasingly successful in producing displays that emulate the appearance of printed paper. In addition, such displays are thin, inexpensive, lightweight, and consume negligible power. In the future, content readers will become even lighter and thinner, and may eventually resemble sheets of paper.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques for creating electronic workspaces using multiple viewer devices, where different content items or other data are assigned to and displayed by different viewer devices. In an environment such as this it can be challenging to distinguish between the multiple viewer devices and to intuitively and unobtrusively manage the assignment and transfer of individual content items to desired viewer devices.

In the described embodiments, an electronic workspace comprises multiple content viewers, to which a user may assign respective content items for viewing. The assignment of content items to individual viewers may be performed through a graphical user interface, in which individual viewers are represented graphically. In some implementations, the user interface may allow a user to simply "drag and drop" content items to the graphical representations of the viewers.

The viewers themselves are dynamically configurable to visually exhibit different identification designs. For example, the case or bezel of each viewer may be controllable to change its color. Alternatively, each viewer device may have an indicator whose color can be controlled, or the display surfaces of the devices may have regions whose color can be controlled for purposes of device identification.

Note that the term "design" is used herein to indicate a visual characteristic such as a color, shade, or pattern. Furthermore, although various examples are described herein as utilizing colors to differentiate between respective devices, it should be understood that other designs, including shades and patterns, may be used in these embodiments rather than color.

In use, the devices are coordinated to select and display device identification designs that are respectively unique. In many embodiments, the designs are characterized by color. Thus, a first device may exhibit a blue identification design, a second device may exhibit a red identification design, and a third device may exhibit a green identification design.

The user interface is then configured to represent each viewer device in terms of its unique device identification design. When a user wishes to perform an operation with respect to a particular device, the user simply notes the visual design exhibited by the device and selects the user interface representation having the same visual design. For example, if a user wishes to assign a document to a device that is exhibiting a blue design (the blue device), the user may simply drag the document icon to a blue device icon. In response, the system provides the document to the blue device, and the blue device displays the document.

Figure 1:
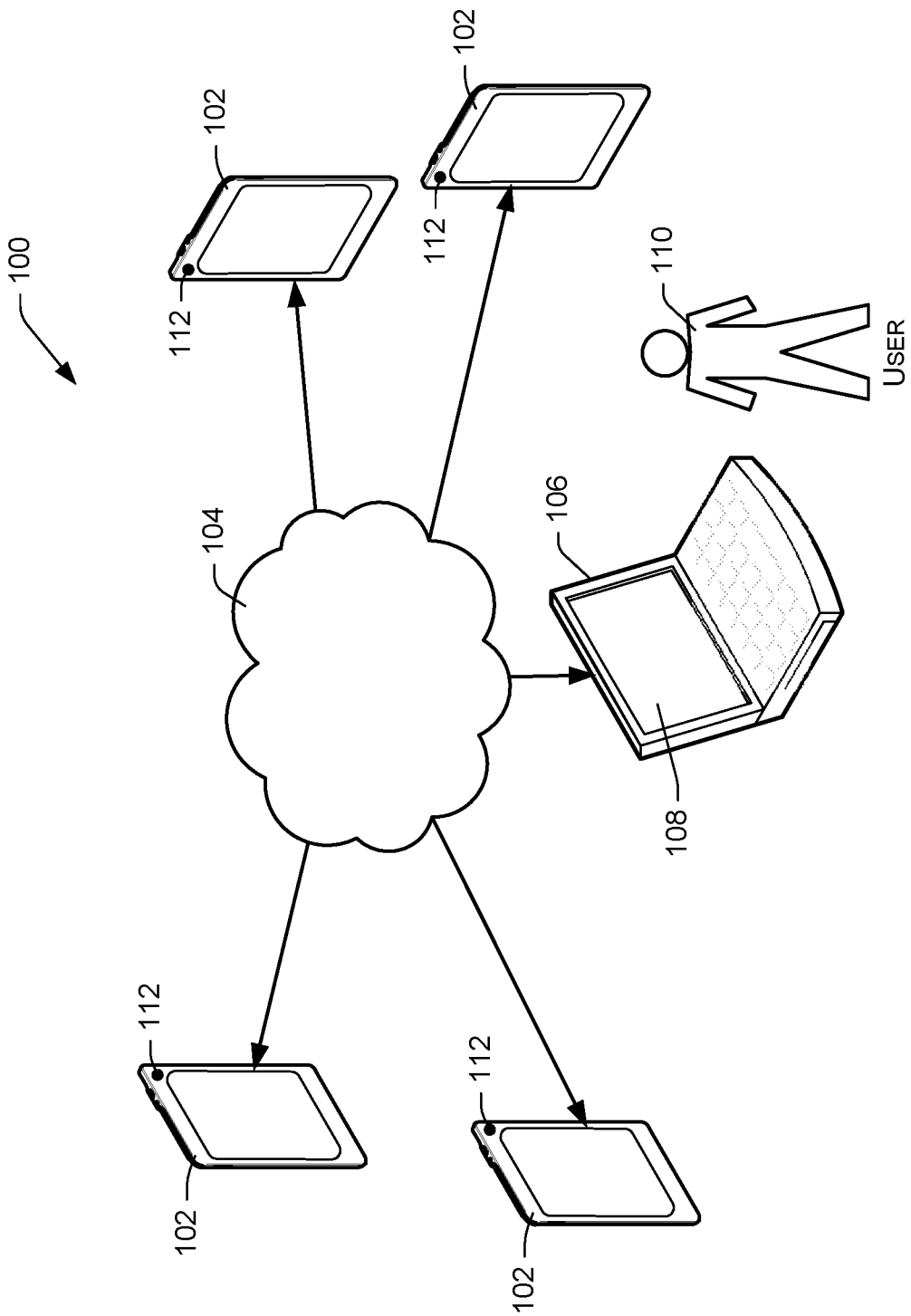
FIG. 1 is a block diagram illustrating an environment and components in which an electronic workspace may be implemented.

FIG. 1 shows an environment 100 in which these techniques may be implemented and practiced. The environment 100 comprises a plurality of electronic reader devices 102, which are also referred to herein as electronic viewers, content viewers, content viewer devices, viewers, or devices. The content viewers 102 may comprise a number of identical devices, or may comprise a variety of different devices.

Content viewers 102 may comprise handheld devices or other small, lightweight, portable devices upon which electronic content can be rendered and conveniently viewed in a manner similar to viewing a sheet of paper, a notepad, a book, or a file. Examples of handheld viewers include flat form-factor devices such as tablets, slates, smartphones, personal digital assistants (PDAs), etc. In addition, dedicated-purpose viewer devices may be used, comprising primarily a display surface and in some embodiments a surrounding case or bezel. Dedicated-purpose viewer devices such as this may have high-contrast, flat-panel displays that appear similar to a printed page and that persist without frequent refreshing. Such displays may consume very negligible amounts of power, so that they may be used for long periods without recharging or replacing batteries. Some embodiments may use flexible display surfaces. Some embodiments may utilize touch-sensitive display surfaces for user interaction. Other embodiments may incorporate buttons or other user interface elements, apart from their display surfaces.

The content viewers 102 are capable of displaying various types of content items, which may include documents such as books, notes, magazines, email, communications, notices, forms, letters, memos, and other matter, which in turn may include text, graphics, pictures, drawings, and so forth. Content may be displayed in black-and-white or with various degrees of shades and colors. Content items may also include various different types of media such as audio, video, and various other types of data objects.

Furthermore, although various techniques are described below in the context of media consumption devices such as content viewers, it is to be understood that the same techniques can be applied in conjunction with various different types of devices, including printers, storage devices, and other peripherals and equipment to which data operations might be directed. The viewers 102 have communication capabilities that allow them to communicate content and other control information. For example, the viewers 102 may have wireless communication interfaces that allow communication though a communications network 104. The wireless communications interfaces may utilize WiFi, cellular, Bluetooth, or other wireless data and networking technologies.

The environment 100 may include a workspace controller 106, which in the described embodiment may comprise a general-purpose computer or other type of computer or computer-like device. A graphical user interface 108 may be implemented by the workspace controller 106, allowing a user 110 to assign or transfer content to different ones of the viewers 102. One or more of the viewers 102 may alternatively function as the workspace controller, and the user interface may be implemented by one of the viewers or by multiple viewers in cooperation. Thus, it may be possible in some embodiments to move and assign content from any one of the viewers to any of the other viewers, using the device differentiation techniques described below.

Each of the viewers 102 has one or more device identification regions 112 that can be dynamically configured to exhibit various different device identification designs such as colors. In FIG. 1, the device identification regions 112 are shown as discrete indicators, such as multi-color LEDs, that can be selectively controlled to exhibit different colors.

In operation, the devices 102 are coordinated so that they each adopt a different device identification color: the device identification color of each device 102 is unique with respect to the other devices 102. Each device 102 then configures its device identification region 112 to display the adopted color of the device 102. This allows a user to differentiate the various devices, which may otherwise appear identical, by their exhibited colors.

The graphical user interface 108 depicts the individual devices 102 in terms of their colors. For example, the device 102 that has adopted the color blue may be represented by the graphical user interface 108 as a blue icon or other graphical representation. Similarly, the device 102 that has adopted the color green may be represented by the graphical user interface 108 as a green icon. Content operations, such as assigning a content item to a particular device 102, may be accomplished by interacting with the displayed device icon having the color of the device 102 that is intended as the object of the operation. For example, an icon representing a content item may be dragged to the icon representing the desired device 102, which may cause that content item to be transferred to and displayed on the device 102. Other types of operations may also be performed with respect to the viewers 102 using this type of dynamically-configured differentiation. Generally, a particular device 102 may be distinguished and selected in this manner whenever it is desired to select one of the plurality of devices 102.

Figure 2:
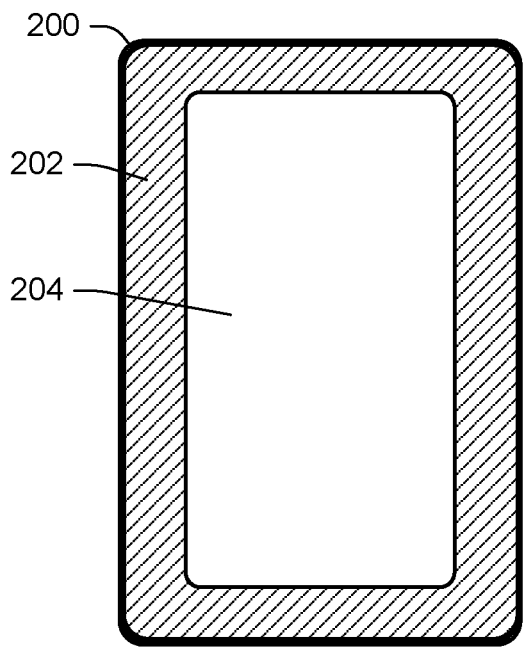
FIGS. 2-5 are front views of example electronic viewer devices that can be coordinated to exhibit different identification designs such as colors.

FIGS. 2-5 show examples of how different embodiments of devices may implement device identification regions. In FIG. 2, a device 200 has a case or bezel 202 that surrounds and supports a display surface 204. In this example, the case or bezel 202 may be fabricated from, covered by, or wrapped in material whose color can be dynamically changed. As an example, Kent Displays, Inc, of Kent, Ohio, United States of America, has developed single-pixel plastic skins that can be cut to custom shapes and conformed to various devices, allowing the devices to dynamically and electronically change their colors between eight available reflective colors. Skins can potentially be combined to create multi-pixel patterns, so that other types of designs might be produced on cases or bezels of electronic devices.

Figure 3:
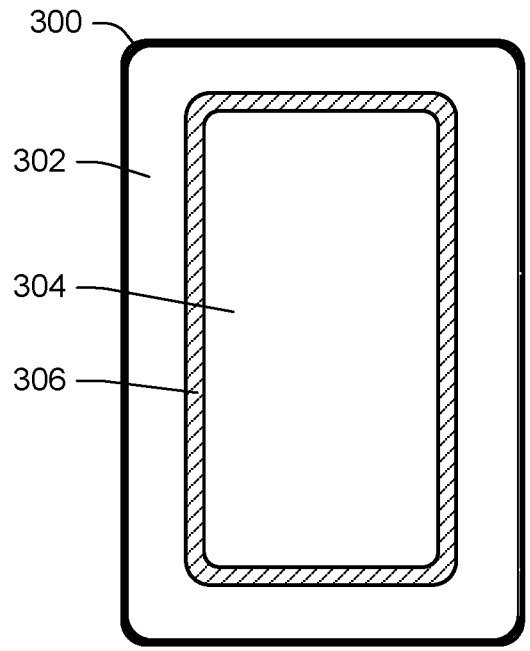

In FIG. 3, a device 300 has a case or bezel 302 whose color is not dynamically configurable. Instead, the device 300 has a display panel 304 having a peripheral region 306 that is dynamically controlled to exhibit the device identification color of the device 300. In some embodiments, the peripheral region 306 may be used for this purpose primarily at times when a user is preparing to transfer content to the device 300 or has some other need to distinguish between available viewer devices. In other embodiments, the peripheral region 306 may be configured to exhibit the device identification color continuously. Still other embodiments may utilize the peripheral region 306 to display the device identification color, while also overlaying portions of content in this region. In these embodiments, the displayed device identification color may be relatively transparent, so that it does not interfere significantly with the presentation of displayed content.

Figure 4:
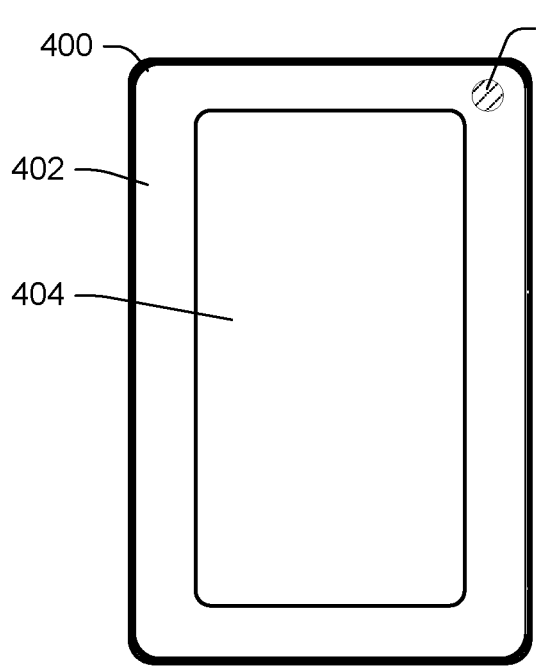

In the example of FIG. 4, a device 400 has a case or bezel 402 surrounding a display panel 404. An indicator 406 is positioned within the bezel 402. The indicator 406 may be an illuminated or reflective element whose color can be electronically controlled and changed by the device 400. For example, the indicator 406 may be a multi-color LED.

Figure 5:
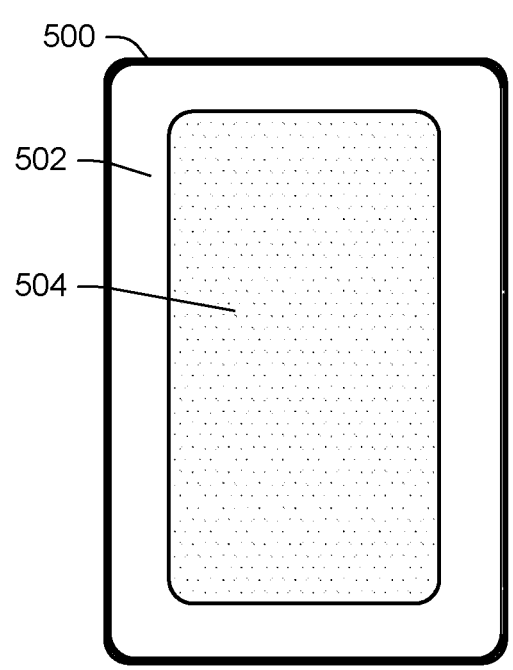

In the example of FIG. 5, a device 500 has a case or bezel 502 surrounding a display panel 504. In this embodiment, the display panel 504 displays the device identification color over its entire surface (as indicated by a dot pattern). The device identification color may be displayed in a relatively transparent manner so that content can be viewed in conjunction with the device identification color, and so that the device identification design does not interfere with the display of content.

Other configurations are possible, and FIGS. 2-5 are intended simply to illustrate the breadth of different techniques that may be used to indicate device identification designs. Note also that although each of the illustrated examples includes a single display surface surrounded by a case or bezel, future embodiments may omit the bezel, might have multiple display surfaces, might have flexible display surfaces, and might differ in other ways from the depicted examples. Furthermore, the described techniques may be used with devices whose primary purpose may not be for content or document viewing, such as personal computers, tablet devices, smartphones, personal media devices, and so forth.

Figure 6:
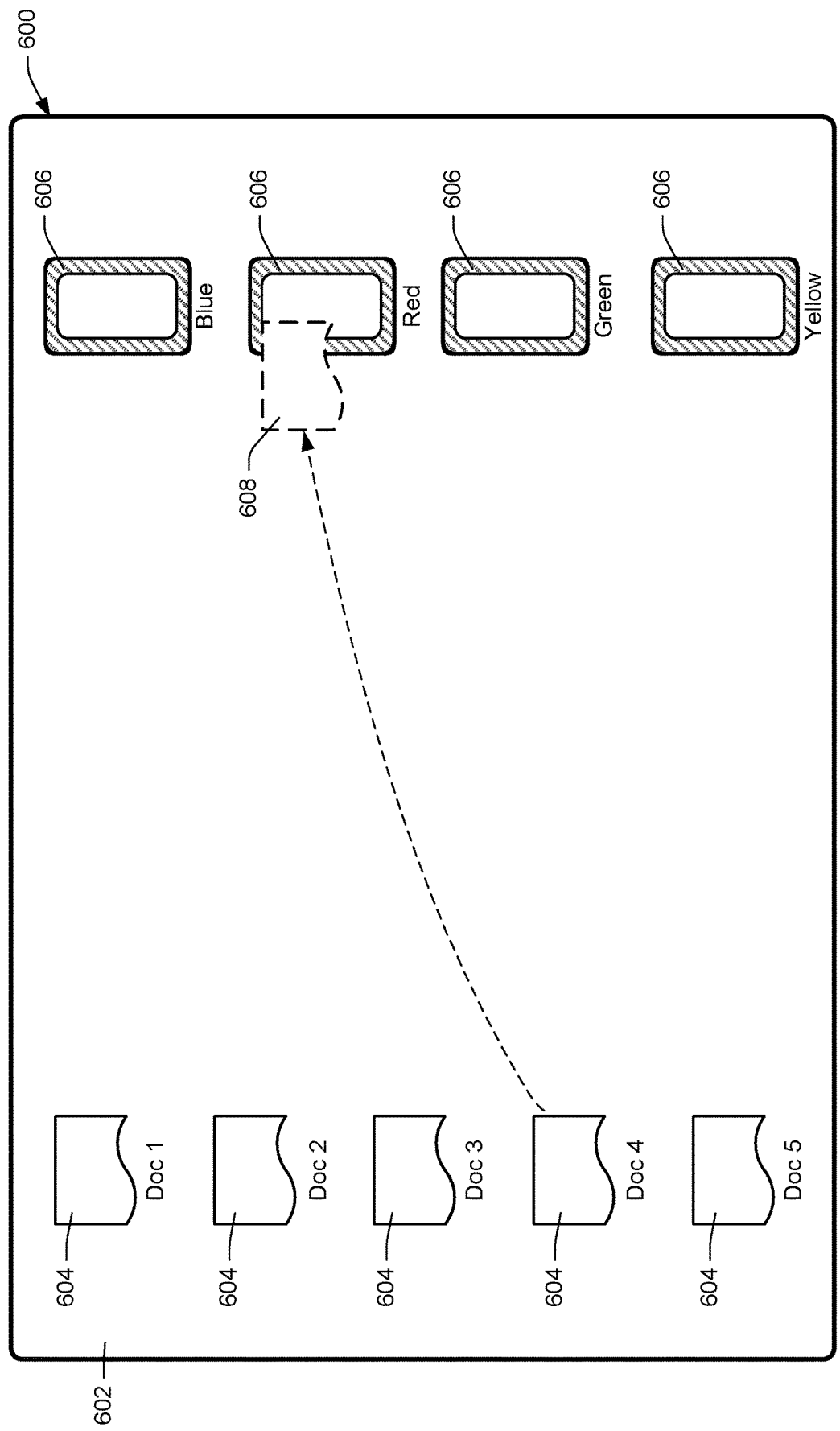
FIG. 6 is a representation of a user interface in which viewer devices are represented graphically by icons of the same colors as the colors of the respectively corresponding viewer devices.

FIG. 6 illustrates, in simplified form, an example of a user interface 600 that may be implemented by the workspace controller 106 to perform content location management among the content viewers 102. The user interface 600 may comprise a pane or window 602 within which graphical elements are displayed. In this example, multiple content items are represented on the left side of the pane 602 by respective content icons 604. Each icon, as illustrated, may be accompanied by text indicating the name of the content item, in this case "Doc 1," "Doc 2," "Doc 3," "Doc 4," and "Doc 5." Multiple content viewers are represented on the right side of the pane 602 by respective device icons 606. Each of these icons may resemble the actual devices that they represent, and may have or emphasize a different color as indicated in FIG. 6 by the accompanying labels "Blue," "Red," "Green," and "Yellow." The color of a particular device icon 606 corresponds to the device identification color of a corresponding content viewer 102. Thus, directing an operation to the "Blue" device icon 606 causes that operation to be performed with respect to the content viewer 102 that is currently exhibiting the same (blue) device identification color.

FIG. 6 illustrates how a particular content item may be assigned and transferred to a particular viewer. In this example, the user selects the content icon 604 labeled "Doc 4" and drags it toward the right, dropping it on the "red" device icon 606. The workspace controller 106 responds to this operation by assigning "Doc 4" to the "red" viewer device 102, and the "red" viewer device then displays "Doc 4" on its display surface.

In some implementations, the selected content icon 604 may be shown in phantom (reference numeral 608) as it is being dragged and before it is dropped on its target device icon 606.

Note that although device icon colors are illustrated as textual labels in FIG. 6, actual implementations may use icons that are appropriately colored to match their corresponding content viewers, reducing or eliminating the need for the textual labels.

Figure 7:
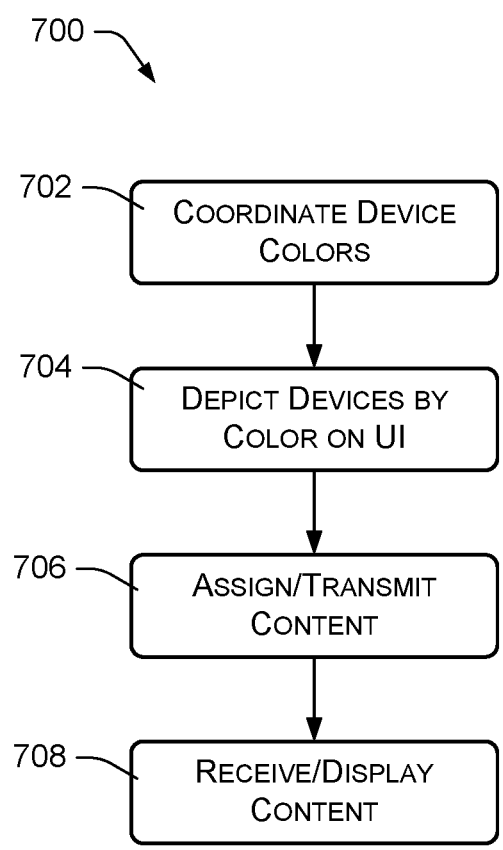
FIG. 7 is a flow diagram illustrating a method of differentiating between multiple available viewers in an electronic workspace.

FIG. 7 illustrates an example of actions that might be performed to implement the techniques described above. An action 702 comprises coordinating a plurality of electronic viewer devices to exhibit respectively unique device identification designs such as colors. To accomplish this, the viewer devices may communicate with each other or with a central coordinator such as the workspace controller 106. As discussed above, designs (including colors) may be exhibited by or on the case or bezel of the devices, within the display areas of the devices, or on other areas of the devices. In the described embodiments, coordinating 702 may comprise dynamically and electronically changing the colors of the device identification regions.

An action 704 comprises presenting a user interface that identifies the individual electronic viewer devices in terms of their respectively unique device identification colors. As described above, this may comprise depicting devices by their colors on the user interface, so that a user can select from among the available viewers based on the colors they currently exhibit.

An action 706 comprises assigning and/or transmitting content items to the electronic viewers in response to user interaction with the presented user interface. An example of such a user interaction is illustrated in FIG. 6, in which an icon representing a content item is dragged to a colored icon representing a viewer device.

An action 708 comprises receiving and/or displaying the assigned content items on the display surfaces of the electronic viewer devices. More specifically, a content item assigned to a particular viewer device is displayed on that device.

Figure 8:
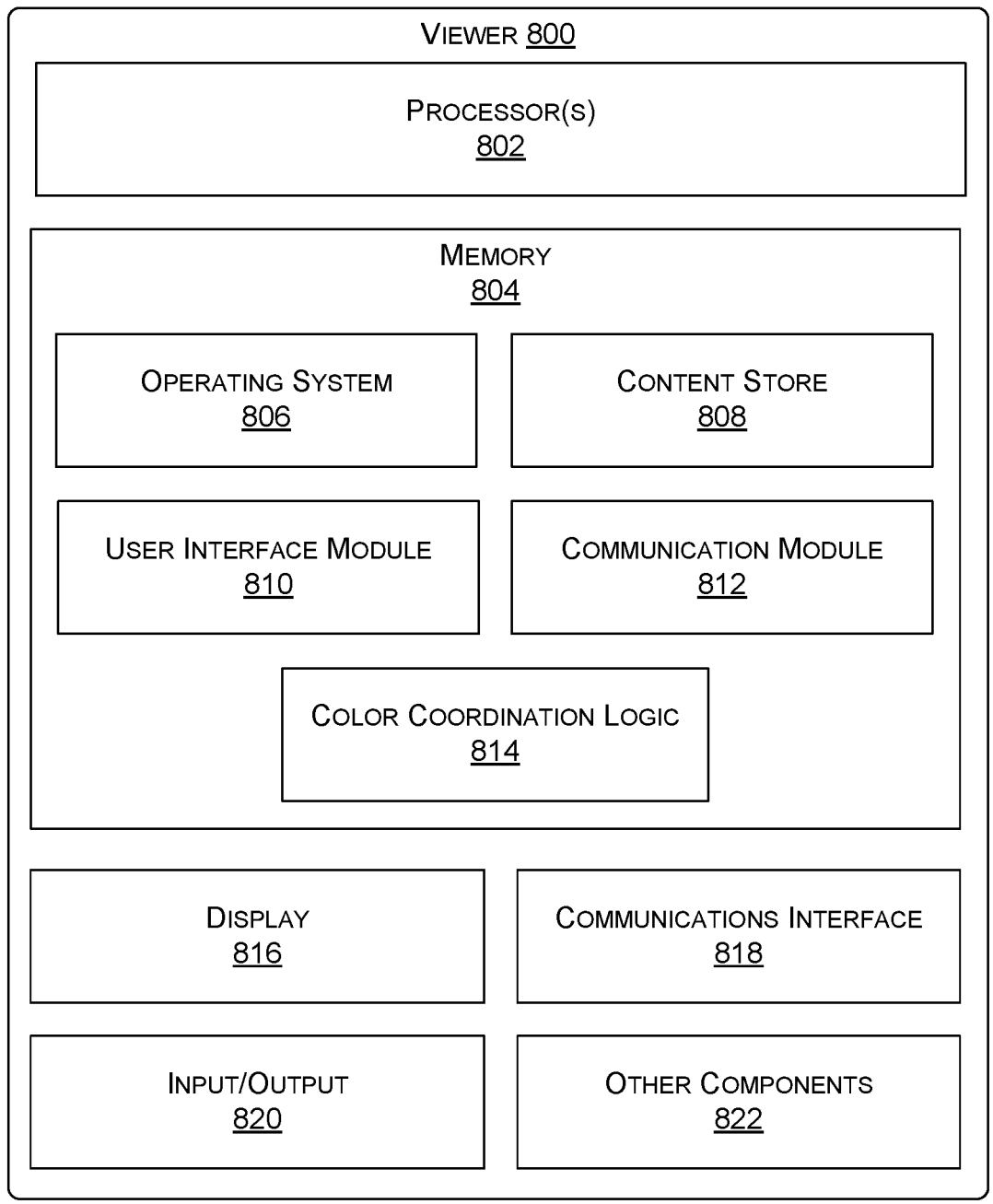
FIG. 8 is a block diagram showing relevant components of a viewer device that can be used in conjunction with the workspace management techniques described herein.

FIG. 8 illustrates relevant components of an example electronic viewer device 800 that may be used in conjunction with the techniques described above. The viewer device 800 may include a processing unit composed of one or more processors 802 and memory 804. Depending on the configuration of the viewer device 800, the memory 804 may comprise computer storage media and may include volatile and nonvolatile memory. Thus, the memory 804 may include, but is not limited to, RAM, ROM, EEPROM, flash memory, or other memory technology, or any other medium which can be used to store media items or applications and data which can be accessed by the viewer device 800.

The memory 804 may be used to store any number of functional components and/or operational logic modules that are executable on the processor 802, as well as data and content items that are displayed by the viewer device 800. Thus, the memory 804 may store an operating system 806 and content store 808.

A user interface module 810 may also be provided in the memory 804 and executed on the processor 802 to provide for user operation of the viewer device 800, including navigational tools and so forth.

A communication module 812 may be stored in the memory 804 and executed on the processor 802 to facilitate communications with other reader devices and/or with a workspace controller if such a controller is being used.

The memory 804 may also contain color coordination logic 814 that allows coordination of device identification colors among multiple viewer devices, so that each viewer device exhibits a different color. In some embodiments, each device may simply respond to a command issued by a workspace controller to exhibit a specified color. In other embodiments, devices may participate in negotiating their colors.

The electronic reader 104 further includes a display 816 upon which content items may be rendered. A communications interface 818 may support wired and/or wireless connection to various devices. In some implementations, the communications interface 818 may comprise a network interface, allowing communications over networks such as cellular networks, radio, WiFi networks, short range networks (e.g., Bluetooth), IR, and so forth. The network interface 818 facilitates receiving content items as discussed herein.

The viewer device may further be equipped with various input/output (I/O) components 820. These may include touch-screen sensors, keys, keypads, buttons, and so forth, which may be used in conjunction with user interface functions.

The viewer device 800 may have various additional components 822 to support its intended operation. For example, it may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Figure 9:
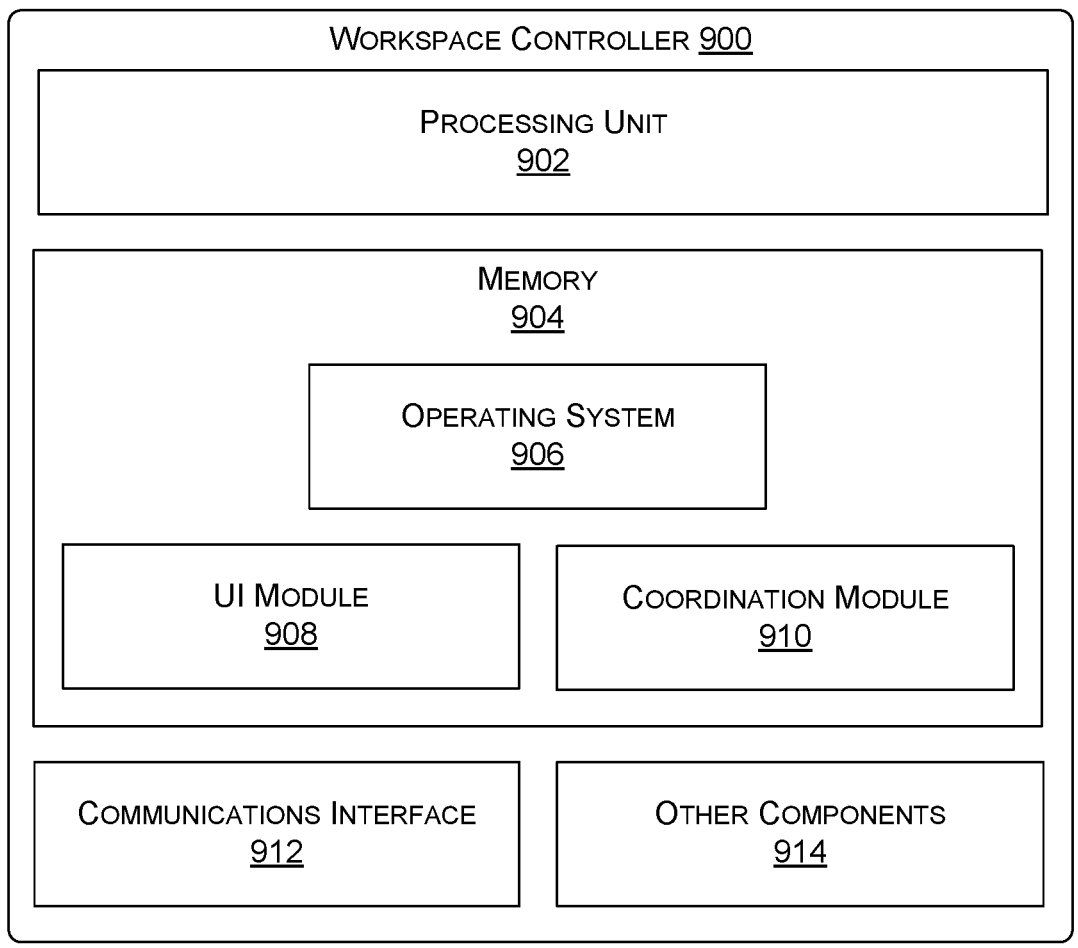
FIG. 9 is a block diagram showing relevant components of a workspace controller that can be used in conjunction with the workspace management techniques described herein.

FIG. 9 illustrates relevant components of an example workspace controller 900 that may be used in the environment described above. The workspace controller 900 may comprise a processing unit 902 composed one of one or more processors, and memory 904. The memory 904 may comprise computer storage media and may include volatile and nonvolatile memory. Thus, the memory 904 may include, but is not limited to, RAM, ROM, EEPROM, flash memory, or other memory technology, or any other medium which can be used to store applications and data.

The memory 904 may be used to store any number of functional components that are executable on the processing unit 902. Thus, the memory 904 may store an operating system 906 that performs basic computer functions and with which other applications may interact to provide higher-level functionality.

The workspace controller 900 may have a user interface module 908 and a design coordination module 910 that interact to provide the user interface functionality described above. In particular, the design coordination module 910 may be configured to communicate with available reader devices and to coordinate their adoption of different device identification designs/colors. The user interface module 908 may then implement a graphical user interface such as shown in FIG. 6, allowing a user to select available reader devices based on their visually exhibited designs.

The workspace controller may also include a communications interface 912 configured to communicate with the available reader devices. The communications interface may use various different technologies, including networking technologies, to communicate with the reader devices.

The workspace controller 900 will of course include other components 914 to support its general functionality and operations.

Note that the various techniques described above are assumed in the given examples to be implemented in the general context of computer-executable instructions or software, such as program modules, executed by one or more computers or other devices, such as the describe workspace controller and viewer devices. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   establishing a connection between a first device and a second device;
   presenting, on a first display of the first device, a first device identification associated with the second device;
   receiving, utilizing an input mechanism of the first device, first user input data indicating a selection associated with the first device identification;
   presenting, on the first display of the first device, a content item;
   receiving, utilizing the input mechanism and at the first device, second user input data indicating a request to send the content item from the first device and to the second device; and
   based at least in part on the selection associated with the first device identification, sending, from the first device and to the second device, the content item.

2. The method of claim 1, further comprising:
   determining that the second device is within a threshold proximity to the first device; and
   presenting the first device identification associated with the second device based at least in part on the second device being within the threshold proximity to the first device.

3. The method of claim 1, further comprising:
   identifying the second device as being available to the first device,
   wherein establishing the connection is based at least in part on the second device being available to the first device.

4. The method of claim 1, wherein the content item comprises a first content item, further comprising:
   presenting, on the first display of the first device, a second content item;
   receiving, at the first device, third input data indicating a request to send the second content item to the second device; and
   sending the second content item from the first device and to the second device.

5. The method of claim 1, further comprising presenting, on the first display of the first device, a third device identification associated with a third device at least partially while the first device identification associated with the second device is presented.

6. The method of claim 5, further comprising:
   receiving, at the first device, third input data indicating another request to send the content item to the third device; and
   sending, from the first device and to the third device, the content item.

7. The method of claim 1, further comprising:
   sending, from the first device, a request message to the second device using a Bluetooth protocol,
   wherein establishing the connection between the first device and the second device is performed at least partly responsive the request message being sent to the second device using the Bluetooth protocol.

8. The method of claim 1, wherein the content item comprises image data stored in memory of the first device.

9. A system comprising:
   one or more processors; and one or more computer-readable media storing computer executable instructions that, when executed by the one or more processors, cause the one or more processors to perform operations comprising:
    establishing a connection between a first device and a second device;
    presenting, on a first display of the first device, a first device identification associated with the second device;
    receiving, utilizing an input mechanism of the first device, first user input data indicating a selection associated with the first device identification;
    presenting, on the first display of the first device, a content item;
    receiving, utilizing the input mechanism and at the first device, second user input data indicating a request to send the content item from the first device and to the second device; and
    based at least in part on the selection associated with the first device identification, sending, from the first device and to the second device, the content item.

10. The system of claim 9, the operations further comprising:
    determining that the second device is within a threshold proximity to the first device; and
    presenting the first device identification associated with the second device based at least in part on the second device being within the threshold proximity to the first device.

11. The system of claim 9, the operations further comprising:
    identifying the second device as being available to the first device,
    wherein establishing the connection is based at least in part on the second device being available to the first device.

12. The system of claim 9, wherein the content item comprises a first content item, the operations further comprising:
    presenting, on the first display of the first device, a second content item;
    receiving, at the first device, third input data indicating a request to send the second content item to the second device; and
    sending the second content item from the first device and to the second device.

13. The system of claim 9, the operations further comprising presenting, on the first display of the first device, a third device identification associated with a third device at least partially while the first device identification associated with the second device is presented.

14. The system of claim 13, the operations further comprising:
    receiving, at the first device, third input data indicating another request to send the content item to the third device; and
    sending, from the first device and to the third device, the content item.

15. The system of claim 9, the operations further comprising:
    sending, from the first device, a request message to the second device using a Bluetooth protocol,
    wherein establishing the connection between the first device and the second device is performed at least partly responsive the request message being sent to the second device using the Bluetooth protocol.

16. The system of claim 9, wherein the content item comprises image data stored in memory of the first device.

17. A method comprising:
    establishing a connection between a first device and a second device;
    presenting, on a first display of the first device, a first device identification associated with the second device;
    receiving, utilizing an input mechanism of the first device, first user input data indicating a selection associated with the first device identification;
    presenting, on the first display of the first device, a representation of a content item;
    receiving, utilizing an input mechanism of the first device, second user input data indicating a request to send the content item from the first device and to the second device; and
    based at least in part on the selection associated with the first device identification, sending, from the first device and to the second device, the content item.

18. The method of claim 17, further comprising:
    determining that the second device is within a threshold proximity to the first device; and
    presenting the first device identification associated with the second device based at least in part on the second device being within the threshold proximity to the first device.

19. The method of claim 17, further comprising presenting, on the first display of the first device, a third device identification associated with a third device at least partially while the first device identification associated with the second device is presented.

20. The method of claim 17, wherein the representation of the content item comprises a first representation of a first content item, further comprising:
    presenting, on the first display of the first device, a second representation of a second content item;
    receiving, at the first device, third input data indicating a request to send the second content item to the second device; and
    sending the second content item from the first device and to the second device.

* * * * *